(12) United States Patent
Nazari

(10) Patent No.: US 6,374,248 B1
(45) Date of Patent: Apr. 16, 2002

(54) METHOD AND APPARATUS FOR PROVIDING LOCAL PATH I/O IN A DISTRIBUTED FILE SYSTEM

(75) Inventor: Siamak Nazari, Arcadia, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/454,246

(22) Filed: Dec. 2, 1999

(51) Int. Cl.[7] ............................................. G06F 15/16
(52) U.S. Cl. .......................................... 707/10; 709/217
(58) Field of Search ........................ 707/10, 1, 8, 100, 707/104.1, 200, 522; 709/101, 201, 203, 200, 218, 219, 221, 227, 229, 245, 275.5

(56) References Cited

U.S. PATENT DOCUMENTS 4,887,204 A * 12/1989 Johnson et al. ................ 707/10

\* cited by examiner

*Primary Examiner*—Thomas Black
*Assistant Examiner*—Apu M Mafiz
(74) *Attorney, Agent, or Firm*—Park, Vaughan & Fleming LLP

(57) ABSTRACT

One embodiment of the present invention provides a system that reduces network traffic during remote file system operations by using a local path between a client and a storage device to bypass transfers through a server. The system operates by receiving a request at the server to access a file located on the storage device; this request is received across a network from an application on a client. Next, the system determines if a local path exists between the client and the storage device containing the file. Note that a local path is independent from a first path between the server and the storage device. If the local path exists, the system sends a bypass request to the client. This bypass request commands the client to satisfy the request by transferring data between the client and the storage device through the local path. In a variation on the above embodiment, the system additionally receives a completion indicator from the client. This completion indicator informs the server that the client successfully completed the request across the local path. In response to the completion indicator, the system updates data structures on the server to indicate that the request has been completed, and then forwards the completion indicator to the application on the client. In a variation on the above embodiment, if the local path does not exist, the system completes the request along a normal path by transferring the data between the client and the server through the network, and between the server and the storage device through the first path. After doing so, the system updates data structures on the server to indicate that the request has been completed and sends a completion indicator to the application on the client.

21 Claims, 3 Drawing Sheets

METHOD AND APPARATUS FOR PROVIDING LOCAL PATH I/O IN A DISTRIBUTED FILE SYSTEM

BACKGROUND

1. Field of the Invention

The present invention relates to file systems that are accessible across computer networks. More particularly, the present invention relates to a method and an apparatus for reducing network traffic during remote file system operations by using a local path between a client and a storage device to bypass transfers through a server.

2. Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access a file on a server computer system across a network. Such distributed file systems make it easy to manipulate files located on a remote server. However, if such distributed file systems are not designed carefully, they can easily generate unnecessary communications across the network, which can degrade overall system performance.

Some distributed operating system have been designed to facilitate high availability. A highly available system provides redundancy so that when a primary node in the highly available system fails a backup secondary node is able to take its place. This allows the system to continue functioning without interruption. Highly available computer systems often provide multiple servers to access a storage device. Each of these servers has its own local data path to the storage device so that if one server fails another can take its place.

At first glance, there appears to be an advantage in using the multiple paths to the storage device to provide parallel access to the storage device, in order to increase overall computer system performance. However, allowing parallel accesses to the storage device can give rise to concurrency and locking problems which can greatly complicate the design of a distributed operating system. For these reasons, it is easier to centralize control over file system accesses within a single server.

However, routing communications through a single server can impede system performance. A major bottleneck is caused by communications between the server and a client across a network. Each block of data retrieved from a storage device must be divided into numerous smaller packets, which are transferred over a network between the client and the server. For example, a 64K block of data retrieved from a disk drive is typically divided into dozens of packets, which are individually sent across the computer network between the client and the server. This process can greatly degrade system performance because each of the packets can generate an interrupt on the server and an interrupt on the client. These interrupts consume a great deal of computational time because process state is saved and restored during each interrupt.

Note that such data transfers across the computer network are largely wasted in the case where the client computer system possesses its own local path to the storage device. What is needed is a method and an apparatus that reduces network traffic during remote file system operations by using a local path between a client and a storage device whenever possible to bypass transfers through a server.

SUMMARY

One embodiment of the present invention provides a system that reduces network traffic during remote file system operations by using a local path between a client and a storage device to bypass transfers through a server. The system operates by receiving a request at the server to access a file located on the storage device; this request is received across a network from an application on a client. Next, the system determines if a local path exists between the client and the storage device containing the file. Note that a local path is independent from a first path between the server and the storage device. If the local path exists, the system sends a bypass request to the client. This bypass request commands the client to satisfy the request by transferring data between the client and the storage device through the local path.

In a variation on the above embodiment, the system additionally receives a completion indicator from the client. This completion indicator informs the server that the client successfully completed the request across the local path. In response to the completion indicator, the system updates data structures on the server to indicate that the request has been completed, and then forwards the completion indicator to the application on the client.

In a variation on the above embodiment, if the local path does not exist, the system completes the request along a normal path by transferring the data between the client and the server through the network, and between the server and the storage device through the first path. After doing so, the system updates data structures on the server to indicate that the request has been completed and sends a completion indicator to the application on the client.

In one embodiment of the present invention, the request can be a read request to read the data from the file or a write request to write the data to the file.

In one embodiment of the present invention, the bypass request to the client includes, a pointer to a buffer on the client, an identifier for the storage device, a block offset into the storage device, and a length of the request. In this embodiment, if the request is a read operation, the buffer on the client holds the data that is read from the storage device. If the request is a write operation, the buffer on the client holds the data to be written to the storage device.

One embodiment of the present invention provides a system that reduces network traffic during remote file system operations by using a local path between a client and a storage device to bypass transfers through a server. The system operates by receiving a request, at the client, to access a file located on the storage device. This request is received from an application running on the client. Next, the system sends the request to the server. The system waits for a request completion indicator to be received from the server. If a bypass request is received from the server, the system transfers data between the client and the storage device through a local path that is independent from a first path between the server and the storage device. Next, the system sends a local path completion indicator to the server. This local path completion indicator informs the server that the data has been transferred across the local path. If a request completion indicator is received from the server, the system forwards the request completion indicator to the application. This request completion indicator specifies that the request has been completed by transferring the data across either the first path or the local path.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computer System

Figure 1:
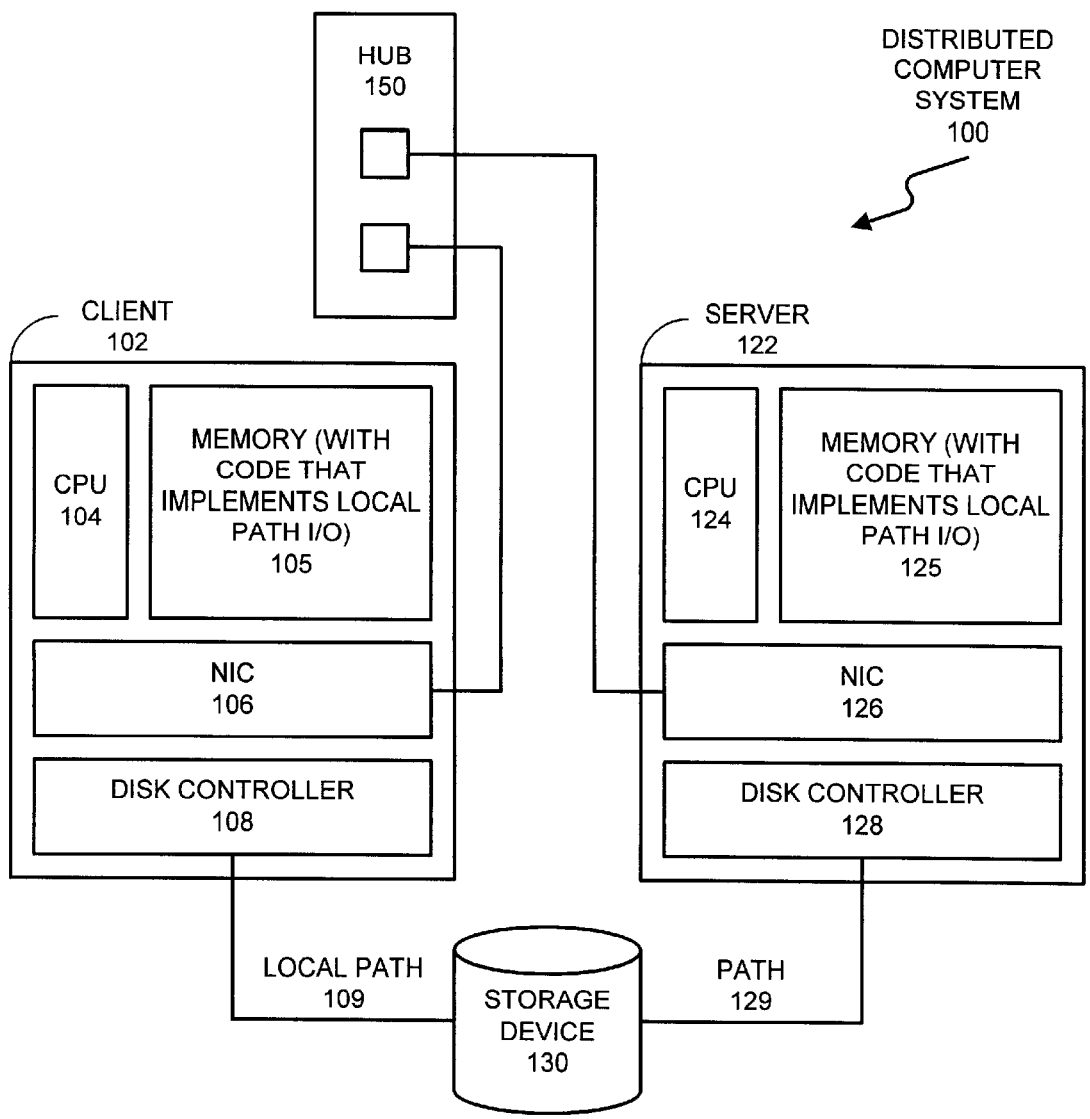
FIG. 1 illustrates a distributed computer system in accordance with an embodiment of the present invention.

FIG. 1 illustrates a distributed computer system 100 in accordance with an embodiment of the present invention. Distributed computer system 100 includes client 102 coupled to server 122. Client 102 may include any node on a network including computational capability and including a mechanism for communicating across the network. Server 122 may include any node on a network including computational capability and data storage capability, as well as a mechanism for servicing requests from client 102 for computational and data storage resources.

Hub 150 implements a network that couples together client 102 and server 122. Client 102 and server 122 use hub 150 to communicate with each other. Hub 150 is a special case of a general network that can be used with the present invention. This general network can include any type of wire or wireless link between computers including, but not limited to, a local area network, a wide area network, or a combination of networks.

Note that client 102 is coupled to hub 150 through network interface controller (NIC) 106. Similarly, server 122 is coupled to hub 150 through network interface controller 126. Network interface controllers 106 and 126 can include any type of interface for coupling client 102 and server 122 with hub 150.

FIG. 1 also includes storage device 130, which is coupled to client 102 and server 122. Storage device 130 includes non-volatile storage for code and/or data and operates under control of client 102 and/or server 122. In one embodiment of the present invention, storage device 130 includes a disk drive.

Storage device 130 is coupled to disk controller 128 within server 122 through path 129. Storage device 130 is also coupled to disk controller 108 within client 102 through local path 109. Disk controllers 108 and 128 include circuitry and software to control a number of disk spindles. Note that local path 109 is independent from path 129.

Client 102 includes central processing unit (CPU) 104. Similarly, server 122 includes CPU 124. Central processing units 104 and 124 can include any type of processing engines that can be used in a computer system, including, but not limited to, microprocessors, mainframe processors, device controllers and processing circuitry within appliances.

CPU 104 is coupled to memory 105, which includes code to implement local path I/O in accordance with an embodiment of the present invention. CPU 124 is coupled to memory 125, which similarly includes code to implement local path I/O. Memories 105 and 125 include any type of random access memory containing code and/or data for CPUs 104 and 124, respectively.

In the embodiment of the present invention illustrated in FIG. 1, client 102 can act as a backup server for fault-tolerance purposes. For example, assume server 122 is the primary server and client 102 functions as a secondary server for storage device 130. If primary server 122 fails during a file system operation, client 102 takes its place. Note, however, that the present invention can be applied to any type of distributed file system, and is not limited to fault-tolerant file systems.

In one embodiment of the present invention, the system illustrated in FIG. 1 operates under control of the SOLARIS™ MC operating system, which is a product of Sun Microsystems, Inc. of Palo Alto, Calif. The Solaris MC operating system is a UNIX-based operating system. Hence, in describing the present technology, UNIX terminology and concepts are frequently used. However, this usage is for purposes of illustration and is not to be construed as limiting the invention to this particular operating system.

Sun, the Sun logo, Sun Microsystems and Solaris are trademarks or registered trademarks of Sun Microsystems, Inc. in the United States and other countries.

Layered Architecture

Figure 2:
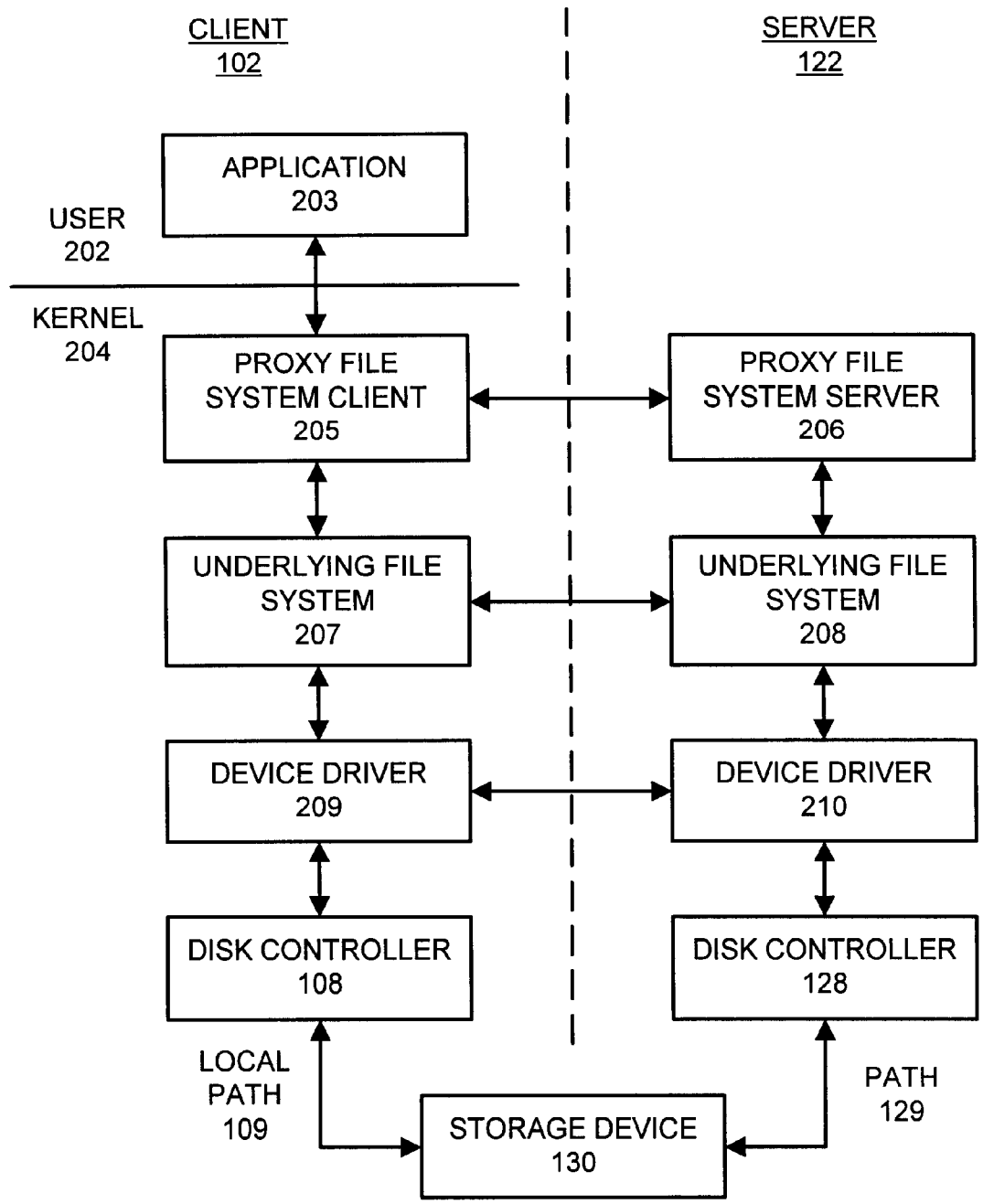
FIG. 2 illustrates a layered architecture for a distributed file system in accordance with an embodiment of the present invention.

FIG. 2 illustrates a layered architecture for a distributed file system in accordance with an embodiment of the present invention. The left-hand side of FIG. 2 illustrates layers that are present on a client side of the distributed file system. The right-hand side of FIG. 2 illustrates layers that are present on a server side of the distributed file system.

The client side of the distributed file system includes an application 203, which makes file system requests. Application 203 operates in user space 202 and makes file system calls to proxy file system client 205 within kernel space 204. Proxy file system client 205 is the client-side portion of a distributed file system. Proxy file system client 205 communicates with proxy file system server 206 within server 122. Note that this communication takes place across a network through hub 150.

Proxy file system server 206 is the server-side portion of the distributed file system. Proxy file system server 206 communicates with underlying file system 208 on server 122.

Underlying file system 208 communicates with device driver 210, which contains code for communicating with disk controller 128 within server 122. Finally, disk controller 128 controls the operation of storage device 130 through path 129. In one embodiment of the present invention, storage device 130 includes a disk drive.

In the embodiment of the present invention illustrated in FIG. 1, client 102 includes a parallel local path 109 to storage device 130. Proxy file system client 205 can also act as a proxy file system server. To this end, proxy file system client 205 communicates with underlying file system 207 on client 102. Underlying file system 207 communicates with device driver 209, which contains code for communicating with disk controller 108. Finally, disk controller 128 communicates with storage device 130 through local path 109.

Note that the process of bypassing file system operations to local path 109 is accomplished through communications between device driver 210 on server 122 and device driver 209 on client 102. This bypassing process is transparent to underlying file system 208 on server 122. Also note that the bypassing process can alternatively be implemented between proxy file system server 206 and proxy file system client 205, or between underlying file system 207 and underlying file system 208.

Process of Bypassing Using Local Path

Figure 3:
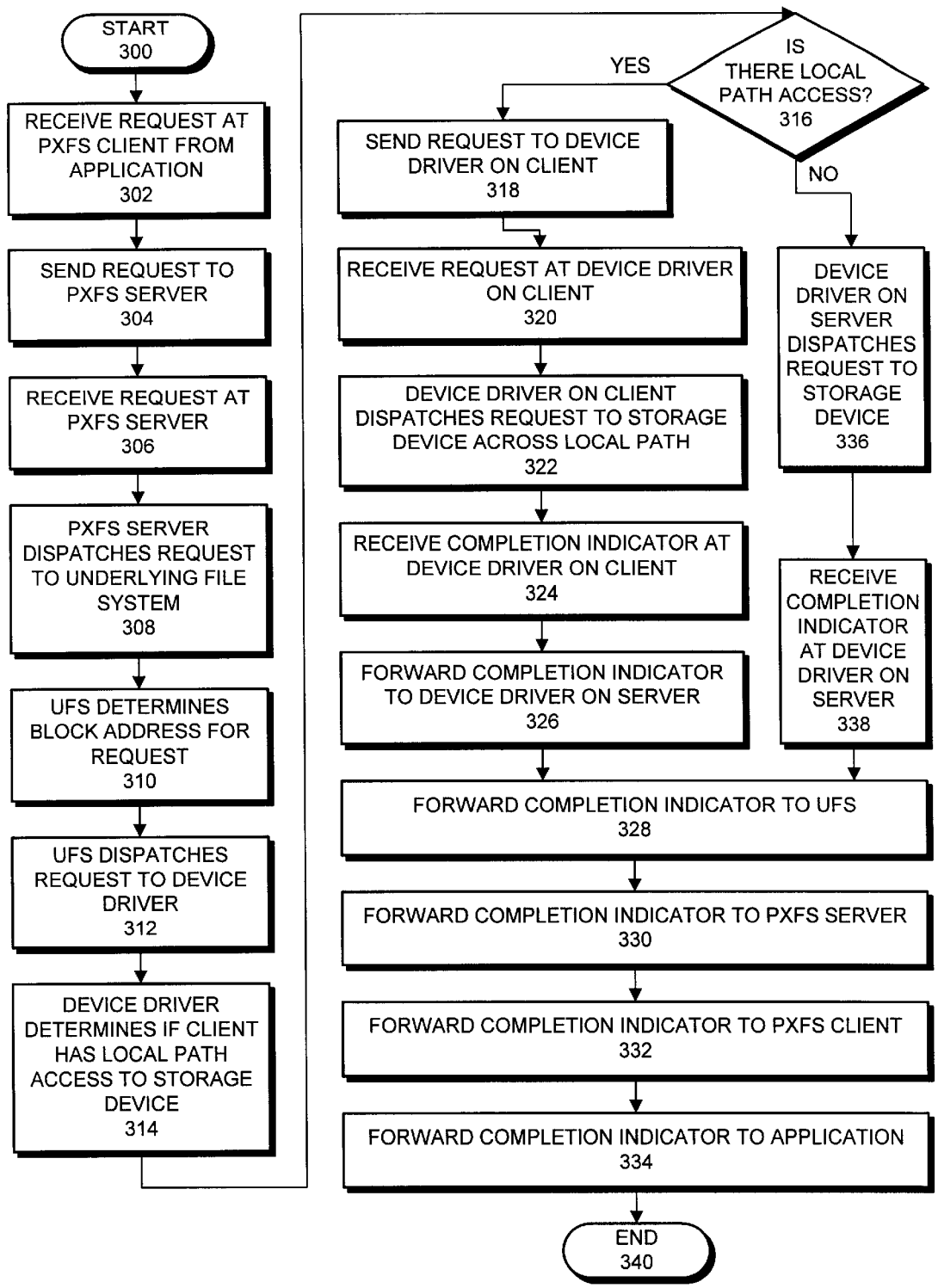
FIG. 3 is a flow chart illustrating the process of using a local path between a client and a storage device to bypass transfers through a server in accordance with an embodiment of the present invention.

FIG. 3 is a flow chart illustrating the process of using local path 109 between client 102 and storage device 130 to bypass transfers through server 122 in accordance with an embodiment of the present invention. The system starts by receiving a request to perform a file system operation at proxy file system client 205 within client 102 (step 302). This request originates from application 203, which is executing on client 102. Proxy file system client 205 dispatches the request to proxy file system server 206 (step 304). Proxy file system server 206 receives the request (step 306) and dispatches the request to underlying file system 208 (step 308). Underlying file system 208 determines the block address of the request (step 310) and dispatches the request to device driver 210 (step 312).

Device driver 210 determines which client made the request, and then determines if the client has local path access to storage device 130 (step 314). Note that a client has local path access to storage device 130 if it can access storage device 130 without using path 129 between storage device 130 and server 122.

If client 102 has local path access to storage device 130, device driver 210 on server 122 sends the request to device driver 209 on client 102 (step 318). This request includes a pointer to a buffer on client 102 for storing file operation data. During a write operation, this buffer stores data to be written to storage device 130. During a read operation, this buffer stores data that is retrieved during the file operation. The request also includes an identifier for storage device 130, as well as a block offset into storage device 130 and a length for the I/O operation.

Device driver 209 on client 102 receives the request (step 320) and then dispatches the request to storage device 130 through disk controller 108 and across local path 109 (step 322). When storage device 130 completes the request, it sends a completion indicator to device driver 209 on client 102. Device driver 209 receives the completion indicator (step 324) and forwards the completion indicator to device driver 210 on server 122 (step 326). Device driver 210 forwards the completion indicator to underlying file system 208 (step 328), which forwards the completion indicator to proxy file system server 206 (step 330). Proxy file system server 206 forwards the completion indicator to proxy file system client 205 (step 332). Finally, proxy file system client 205 forwards the completion indicator to application 203 to complete the file access operation (step 334).

If, in step 316, device driver 210 on server 122 determines that there is no local path that can be used to bypass the file transfer operation, device driver 210 dispatches the request through a normal path to storage device 130 through disk controller 128 (step 336). Upon receiving a completion indicator from storage device 130 (step 338), device driver 210 forwards the completion request to underlying file system 208 (step 328). Underlying file system 208 forwards the completion indicator to proxy file system server 206 (step 330). Proxy file system server 206 forwards the completion indicator to proxy file system client 205 on client 102 (step 332). Finally, proxy file system client 205 forwards the completion indicator to application 203 to complete the file access operation (step 334).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for reducing network traffic during remote file system operations, the method operating in a system including a client and a server for a storage device, the client having a local path to the storage device, the method comprising:

receiving a request, at the server, to access a file located on the storage device, the storage device being coupled to the server through a first path;

wherein the request is received from the client across a network having been generated by an application on the client;

determining, at the server, if the local path exists between the client and the storage device containing the file;

wherein the local path is independent from the first path between the server and the storage device; and if the local path exists, sending a bypass request to the client, the bypass request commanding the client to satisfy the request by transferring data between the client and the storage device through the local path.

2. The method of claim 1, further comprising:

receiving a completion indicator from the client, the completion indicator informing the server that the client successfully completed the request across the local path;

updating data structures on the server to indicate that the request has been completed; and forwarding the completion indicator to the application on the client.

3. The method of claim 1, wherein if the local path does not exist, the method further comprises:

completing the request along a normal path by transferring the data between the client and the server through the network and between the server and the storage device through the first path;

updating data structures on the server to indicate that the request has been completed; and sending a completion indicator to the application on the client.

4. The method of claim 1, wherein the bypass request to the client includes,
a pointer to a buffer on the client,
an identifier for the storage device,
a block offset into the storage device for the request, and
a length of the request;

wherein if the request is a read operation, the buffer on the client holds the data that is read from the storage device; and wherein if the request is a write operation, the buffer on the client holds the data to be written to the storage device.

5. A method for reducing network traffic during remote file system operations, the method operating in a system including a client and a server for a storage device, the client having a local path to the storage device, the method comprising:

receiving a request, at the client, to access a file located on the storage device;

wherein the request is received from an application running on the client;

sending the request to the server; and if a bypass request is received from the server,
transferring data between the client and the storage device through the local path, the local path being separate from a first path between the server and the storage device so that the data bypasses the server, and sending a local path completion indicator to the server, the local path completion indicator informing the server that the data has been transferred across the local path.

6. The method of claim 5, further comprising if a request completion indicator is received from the server, forwarding the request completion indicator to the application;

wherein the request completion indicator specifies that the request has been successfully completed by transferring the data across either the first path or the local path.

7. The method of claim 5,
wherein the bypass request to the client includes,
a pointer to a buffer on the client,
an identifier for the storage device,
a block offset into the storage device for the request, and
a length of the request;

wherein if the request is a read operation, the buffer on the client holds the data that is read from the storage device; and wherein if the request is a write operation, the buffer on the client holds the data to be written to the storage device.

8. A computer readable storage medium storing instructions that when executed by a computer cause the computer to perform a method for reducing network traffic during remote file system operations, the method operating in a system including a client and a server for a storage device, the client having a local path to the storage device, the method comprising:

receiving a request, at the server, to access a file located on the storage device, the storage device being coupled to the server through a first path;

wherein the request is received from the client across a network having been generated by an application on the client;

determining, at the server, if the local path exists between the client and the storage device containing the file;

wherein the local path is independent from the first path between the server and the storage device; and if the local path exists, sending a bypass request to the client, the bypass request commanding the client to satisfy the request by transferring data between the client and the storage device through the local path.

9. The computer-readable storage medium of claim 8, wherein the method further comprises:

receiving a completion indicator from the client, the completion indicator informing the server that the client successfully completed the request across the local path;

updating data structures on the server to indicate that the request has been completed; and forwarding the completion indicator to the application on the client.

10. The computer-readable storage medium of claim 8, wherein if the local path does not exist the method further comprises:

completing the request along a normal path by transferring the data between the client and the server through the network and between the server and the storage device through the first path;

updating data structures on the server to indicate that the request has been completed; and sending a completion indicator to the application on the client.

11. The computer-readable storage medium of claim 8,
wherein the bypass request to the client includes,
a pointer to a buffer on the client,
an identifier for the storage device,
a block offset into the storage device for the request, and
a length of the request;

wherein if the request is a read operation, the buffer on the client holds the data that is read from the storage device; and wherein if the request is a write operation, the buffer on the client holds the data to be written to the storage device.

12. A computer readable storage medium storing instructions that when executed by a computer cause the computer to perform a method for reducing network traffic during remote file system operations, the method operating in a system including a client and a server for a storage device, the client having a local path to the storage device, the method comprising:

receiving a request, at the client, to access a file located on the storage device;

wherein the request is received from an application running on the client;

sending the request to the server; and if a bypass request is received from the server,
transferring data between the client and the storage device through the local path, the local path being separate from a first path between the server and the storage device so that the data bypasses the server, and sending a local path completion indicator to the server, the local path completion indicator informing the server that the data has been transferred across the local path.

13. The computer readable storage medium of claim 12, wherein if a request completion indicator is received from the server the method further comprises, forwarding the request completion indicator to the application;

wherein the request completion indicator specifies that the request has been successfully completed by transferring the data across either the first path or the local path.

14. The computer readable storage medium of claim 12, wherein the bypass request to the client includes, a pointer to a buffer on the client,
an identifier for the storage device,
a block offset into the storage device for the request, and
a length of the request;
wherein if the request is a read operation, the buffer on the client holds the data that is read from the storage device; and
wherein if the request is a write operation, the buffer on the client holds the data to be written to the storage device.

15. An apparatus that reduces network traffic during remote file system operations by using a local path between a client and a storage device, comprising:
a receiving mechanism within the server that receives a request to access a file located on the storage device, the storage device being coupled to the server through a first path;
wherein the request is received from the client across a network having been generated by an application on the client;
a bypassing mechanism within the server for bypassing file access requests to the local path;
wherein the bypassing mechanism is configured to determine if the local path exists between the client and the storage device containing the file, the local path being separate from the first path between the server and the storage device; and
wherein if the local path exists, the bypassing mechanism is configured to send a bypass request to the client, the bypass request commanding the client to satisfy the request by transferring data between the client and the storage device through the local path.

16. The apparatus of claim 15, wherein the bypassing mechanism is further configured to:
receive a completion indicator from the client, the completion indicator informing the server that the client successfully completed the request across the local path;
update data structures on the server to indicate that the request has been completed; and
forward the completion indicator to the application on the client.

17. The apparatus of claim 15, wherein if the local path does not exist, the bypassing mechanism is configured to:
complete the request along a normal path by transferring the data between the client and the server through the network and between the server and the storage device through the first path;
update data structures on the server to indicate that the request has been completed; and
send a completion indicator to the application on the client.

18. The apparatus of claim 15,
wherein the bypass request to the client includes,
a pointer to a buffer on the client,
an identifier for the storage device,
a block offset into the storage device for the request, and
a length of the request;
wherein if the request is a read operation, the buffer on the client holds the data that is read from the storage device; and
wherein if the request is a write operation, the buffer on the client holds the data to be written to the storage device.

19. An apparatus that reduces network traffic during remote file system operations by using a local path between a client and a storage device, comprising:
an application processing mechanism within the client that receives a request from an application to access a file located on the storage device;
a file access processing mechanism that is configured to send the request to the server;
a bypass processing mechanism that is configured to,
receive a bypass request from the server,
transfer data between the client and the storage device through the local path, the local path being separate from a first path between the server and the storage device so that the data bypasses the server, and
send a local path completion indicator to the server, the local path completion indicator informing the server that the request has been completed across the local path.

20. The apparatus of claim 19, wherein the file access processing mechanism is further configured to:
receive a request completion indicator from the server, the request completion indicator specifying that the request has been successfully completed by transferring the data across either the first path or the local path; and to
forward the request completion indicator to the application.

21. The apparatus of claim 19,
wherein the bypass request to the client includes,
a pointer to a buffer on the client,
an identifier for the storage device,
a block offset into the storage device for the request, and
a length of the request;
wherein if the request is a read operation, the buffer on the client holds the data that is read from the storage device; and
wherein if the request is a write operation, the buffer on the client holds the data to be written to the storage device.

* * * * *